(12) United States Patent
Tamaki

(10) Patent No.: US 7,471,716 B2
(45) Date of Patent: Dec. 30, 2008

(54) SPREAD SPECTRUM SYSTEM COMMUNICATION UNIT AND ITS METHOD FOR ESTABLISHING HIGH SPEED SYNCHRONIZATION

(75) Inventor: Haruro Tamaki, Maebashi (JP)

(73) Assignee: Mathematical Assist Design Laboratories Co., Ltd., Maebashi-shi (JP)

(*) Notice: Subject to any disclaimer, the term of this patent is extended or adjusted under 35 U.S.C. 154(b) by 395 days.

(21) Appl. No.: 10/509,857

(22) PCT Filed: Feb. 3, 2003

(86) PCT No.: PCT/JP03/01054

§ 371 (c)(1),
(2), (4) Date: Mar. 29, 2005

(87) PCT Pub. No.: WO2004/070967

PCT Pub. Date: Aug. 19, 2004

(65) Prior Publication Data

US 2005/0180489 A1    Aug. 18, 2005

(51) Int. Cl.
*H04B 1/00* (2006.01)

(52) U.S. Cl. .................. 375/150; 375/149; 375/130; 375/140

(58) Field of Classification Search ......... 375/146–147, 375/135, 238–239, 259, 219, 289, 295, 130, 375/140, 149, 150, 152; 342/350, 352, 357.01, 342/357.06, 357.15

See application file for complete search history.

(56) References Cited

U.S. PATENT DOCUMENTS 5,579,304 A * 11/1996 Sugimoto et al. ........... 370/342
6,243,409 B1    6/2001 Fenton et al.
7,257,148 B2 *  8/2007 Suzuki ....................... 375/146
2001/0036221 A1* 11/2001 Sato .......................... 375/147

(Continued)

FOREIGN PATENT DOCUMENTS

EP    0 892 277 A2    1/1999

(Continued)

OTHER PUBLICATIONS

Kalofonos, D.N. et al, "On the performance of coded low spreading gain DS-CDMA systems with random spreading in sequences multipath Rayleigh fading channels", vol. 5 of 6, Nov. 25, 1001, pp. 3247-3251, XP010746328, ISBN: 0-7903-7206-9, Sections I and II.

(Continued)

*Primary Examiner*—Shuwang Liu
*Assistant Examiner*—James M Perez
(74) *Attorney, Agent, or Firm*—Frishauf, Holtz, Goodman & Chick, P.C.

(57) ABSTRACT

A device for spread spectrum communication is provided which enables synchronization at a high-speed even if the carrier frequency and the phase are not known precisely on the receiving end. The device for spread spectrum communication includes a toggle detecting unit and a demodulating unit. The toggle detecting unit detects a candidate of a toggle point existing in a carrier of a received signal, and the demodulating unit demodulates the received signal by multiplying the received signal by a spread code which is shifted according to a shift amount calculated based on the detected candidate.

10 Claims, 12 Drawing Sheets

U.S. PATENT DOCUMENTS

2002/0167991 A1* 11/2002 Suzuki ........................ 375/130

FOREIGN PATENT DOCUMENTS

| JP | 6-90222 | * | 3/1994 |
| JP | 6-90222 | A | 3/1994 |
| JP | 7-221805 | A | 8/1995 |
| JP | 2001-313589 | A | 11/2001 |

OTHER PUBLICATIONS

Supplementary European Search Report dated May 23, 2007, issued in a counterpart European Application.

European Patent Office Communication dated Jun. 11, 2007, issued in a counterpart European Application.

European Patent Office Communication dated Aug. 17, 2007, issued in a counterpart European Application.

* cited by examiner

SPREAD SPECTRUM SYSTEM COMMUNICATION UNIT AND ITS METHOD FOR ESTABLISHING HIGH SPEED SYNCHRONIZATION

This application is a U.S. National Phase Application under 35 USC 371 of International Application PCT/ JP2003/ 001054 filed Feb. 3, 2003.

TECHNICAL FIELD

The present invention relates to an equipment for spread spectrum communication, particularly relates to an equipment realizing super-low-power long-distance communication and relates to a high-speed synchronization establishing method for spread spectrum communication.

BACKGROUND-ART

Nowadays, radio systems such as wireless LAN or mobile phones have been widely used. The radio systems have been improved day by day in order to transmit more information at a faster speed.

However, some fields do not require a lot of information so much from one source. For example, the medical field (including radio calling system in the hospital), meteorologic field, disaster-prevention field, and environmental field usually require only approximately 100-bit-per-minute information. In addition, alerting for landslide requires only one-bit-per-second information.

In these fields, it is difficult to apply directly the technology about wireless LAN or mobile phones because of the problems of power consumption and costs. These fields require a radio system covering a very wide area, working by low power, and communicating by low cost (require a super-low-power long-distance communication radio system). More precisely, the following performances are required.
Communicable by approximately 50 nW output power
Communicable for a long distance (100 m for example)
Communicable one to ten bits of information per second In addition, since a lot of information does not need to be communicated in the radio system as mentioned above, the communication speed does not need to be high-speed.

Meanwhile, identification ability about transmission media (electric wave, acoustic wave or light wave) is necessary to obtain super high sensitivity for long distance communication. The identification ability is dominated by a receiving bandwidth. A wider receiving bandwidth increases relatively natural noise power and the probability of radio interference with other communication. Therefore, an extremely narrow receiving bandwidth increases communicable distance relatively.

Moreover, the extremely narrow receiving bandwidth can reduces required power. For example, when the receiving bandwidth, approximately 20 kHz in general FM (Frequency Modulation) broadcasting, is narrowed to 1 Hz, the required power is reduced to one-to-twenty-thousand. One-to-twenty-thousand of 10 mW special-low power is 0.5 µm. When the receiving bandwidth of 10 W ham radio, which can communicate worldwide, is narrowed to 1 Hz, the required power is reduced to one-to-twenty-thousand, or to 0.5 mW.

As mentioned above, by narrowing the receiving bandwidth (for example, by narrowing to approximately 1 Hz as mentioned above) may realize a super-low-power long-distance communication radio system which is required in the mentioned fields.

However, an accuracy of the frequency of 150 MHz crystal oscillator is approximately 15 ppm; a frequency deviation of which is 3 kHz. This 3 kHz frequency deviation is 3,000 times larger than that of 1 Hz in the above example. Therefore, a carrier must be searched over the bandwidth corresponding to 1,000 channels even if every three frequency is used. Moreover, by just narrowing the receiving bandwidth, it is difficult to remove the radio interference in the conventional communication.

Accordingly, applying spread spectrum communication to narrowed receiving bandwidth, or to "narrowed occupied-bandwidth long-distance communication", will be considered. If the spread spectrum communication can be applied, the carrier does not need to be searched and the radio interference can be removed properly.

The spread spectrum communication will be described concisely. The spread spectrum communication, the development of which was started from 1960's for military and space communication, is widely used for CDMA (Code Division Multiple Access) on mobile phones, short-distance communication by personal computers (Bluetooth), and wireless LAN (Local Area Network).

Originally, the spread spectrum communication had two aspects. The one aspect was for a long-distance communication by very weak electric-wave for military or satellite use. The other one was for multiplex communication maintaining multiple communication paths at the same frequency. The former aspect is mainly used for GPS (Global Positioning System), now employed for car navigation systems; the latter one is mainly used for the other purpose.

The spread spectrum communication reproduces an original carrier on the receiving end by multiplying a received signal by a spread signal. Before multiplying, the spread signal, applied for modulating (spreading) the original carrier on the transmitting end, is synchronized by shifting a phase of the spread signal by the time corresponding to transmission delay. To reproduce the original carrier as mentioned above is called "despread" or "demodulate".

For despreading, the spread signal being multiplied must be shifted by the time corresponding to the transmission delay. Accordingly, in order to receive successfully on the receiving end without acknowledging the time of the transmission delay, trials of despreading (demodulating) operation is repeated while the spread code is slid little by little (for example, the shift amount which is to be provided to the spread code is increased in increments of one chip-time (the minimum time-unit of the spread code) with respect to the each trial step), and then feasibility of receiving is determined by checking the useful level of the reproduced carrier.

This synchronizing procedure as mentioned above is called "slide method". (In addition, the carrier frequency must be known on the receiving end in the synchronizing procedure).

In the synchronizing procedure, a required time for synchronizing is roughly calculated by multiplying the period time of M-Sequence (Maximum Length Sequence) by the number of chips of M-Sequence, if M-Sequence is used as the spread code. For example, in a high-speed wireless LAN where the transmission speed is 11 Mbps and the spread code has the length corresponding to 11 chips, when the slide method is performed under the condition that the shift amount added by every trial step corresponds to one chip-time, the synchronization is established after 11 trials at the longest.

Accordingly, when one chip-time is 0.1 µs, the required time for one trial is 1.1 µs (0.1 µs×11 chips). The required time for 11 trials is 12 µs (1.1 µs×11 chips) in the slide method. In other words, the synchronization is established in such a short time.

Moreover, when the slide method is performed in GPS where the spread-code length is 1,023 chips, the required time for one trial is corresponding to 1,023 chip-times (one period time of the spread code) at the minimum. When the spread code is slid repeatedly in increments of the half of one chip-time, the synchronization is established by 2,046 slides (2,046 trials). Accordingly, the required time for synchronizing is corresponding to two-million-chip-time (1,023 chip-times×2,046). The longest required time is 2 seconds and an average required time is 1 second in GPS where the chip-time is 1 µs.

The required time for synchronizing will be considered when the spread spectrum communication, as mentioned above, is applied to "the narrowed occupied-bandwidth long-distance communication" and the slide method is performed.

The one chip-time of the spread code must be long to some extent (for example, 0.1 ms=10 kHz) when the receiving bandwidth is narrowed to approximately 1 Hz. When 1,023-chip-spread-code is applied, according to the above example of GPS, two-million-chip-time is required for synchronizing at the maximum. Accordingly, when the one chip-time of the spread code is 0.1 ms=10 kHz, the required time for synchronizing is 200 s (0.1 ms×two-million-chip-time). Therefore, an average time for synchronizing from the first receive to the first one-bit detection is 100 s; the longest time of that is 200 s.

As mentioned above, the slide method takes considerable time when the spread spectrum communication is applied to the narrowed occupied-bandwidth long-distance communication. Accordingly, an extra transmission time for synchronizing is required. However, a longer transmission time reduces electric-power-efficiency because it needs more electric power. Therefore, the super-low-power long-distance communication radio system cannot be realized by just applying the spread spectrum communication to the narrowed occupied-bandwidth long-distance communication (the first problem).

In addition, since the carrier wavelength of 150 MHz frequencies is 2 m, when a transmitter moves closer to or moves away from a receiver by 10 m/s, the receiver recognizes five-lower frequencies than the 150 MHz frequencies (150 MHz−5 Hz) or a five-higher frequencies than the 150 MHz frequencies (150 MHz+5 Hz). When the transmitter moves closer to or moves away from the receiver by 10 m/s, the chip-time of the spread code is 0.1 ms, and the spread-code length is 1,023 chips; the phase is changed 0.5 Hz, or 180 degrees, during one period-time (0.1 s).

In the above case, if an initial phase of the carrier is zero when the carrier is detected by despreading the received signal, a phase at the end part of the carrier is reversed. Therefore, the synchronization cannot be established (the second problem).

Furthermore, in the above case, establishing the synchronization takes 1,023 s at the longest when a communication rate is 1 bps and the spread-code length is 1,023 chips. Accordingly, 20 minutes from the first receiving are required before receiving data, and much time is required for synchronizing. Therefore, there is a problem for practical use (the third problem).

In addition, as a improvement of the above, an synchronization detecting method by digitizing the whole period time is known. According to the method, it seems to be able to shorten the detecting time for synchronization. However, when the carrier frequency cannot be recognized with a high degree of precision, the method causes problems such as described below.

If the carrier frequency has deviation; for example, 150 MHz±15 ppm (±2.25 kHz) (standard Xtal), one chip-time of the spread code is 0.1 ms, and the spread-code length is 1,023 chips; when the carrier frequency is changed by 5 Hz, maintaining the synchronization is difficult; when the carrier frequency is changed by 10 Hz, it can be different communication.

Accordingly, in a transmission based on phase-modulation such as the spread spectrum communication, if a phase amount of a carrier signal is not known within 0.5 period-time of the carrier over the whole 0.1 s period-time of the spread code (0.1 ms×1,023), the detection of a carrier level will fail. In short, the carrier frequency must be known precisely for synchronizing the spread code. 450 trials are required for detecting the carrier included in ±2.25 kHz in increments of 10 Hz. Therefore, when the carrier frequency has deviation, synchronizing the spread code is practically difficult (the forth problem).

Moreover, in the synchronization detecting method by digitizing the whole period time, a high-speed correlation is performed by Surface Acoustic Wave (SAW) device or others as a hardware correlation (for example, Japanese Patent Application KOKAI Publication No. 09-64787). In order to realize a long-distance communication with a low-speed communication and a low electric power, a long-time correlator is required physically. However, producing that kind of correlator is difficult (the fifth problem).

In brief, the phase must be guaranteed throughout a repeated time of the spread code in order to establish the synchronization in the conventional method; since the conventional method knows the carrier frequency or the carrier speed; can corrects the phase shifts; prepares the spread code having a proper shift amount by using that the spread-code length is short; and repeats the steps of Despread, Phase Detection, and Establishing Synchronization.

In other words, the carrier frequency must be known precisely in order to synchronize the spread code, also the spread code must be synchronized in order to know the carrier frequency.

The present invention has been invented for solving the problems as described above. An object of the present invention is to provide an equipment for spread spectrum communication which enables to realize super-low-power long-distance communication, enables to establish the synchronization at a high-speed, and enables to synchronize the spread code even if the carrier frequency is not known precisely. Another object of the present invention is to provide a synchronization establishing method for the spread spectrum communication.

DISCLOSURE OF THE INVENTION

The equipment of this invention for spread spectrum communication comprises a toggle detecting unit and a demodulating unit. The toggle detecting unit is configured for detecting a candidate of a toggle point existing in the carrier of the received signal. The demodulating unit is configured for demodulating the received signal by multiplying the received signal by the spread code which is shifted according to the shift amount calculated based on a result of the detected candidate.

In addition, it is desirable that the toggle detecting unit be configured so that it may detect the candidate of the toggle point by correlating between the carrier of the received signal and a pre-held expected signal. Moreover, it is desirable that the pre-held expected signal be a signal including a waveform of the toggle point which is expected to be in the carrier of the received signal, and be a signal having length corresponding to 2 chip-times of the spread code or shorter than the length.

Furthermore, it is desirable that the toggle detecting unit be configured so that it may output the toggle signal as a result of detecting of the candidate of the toggle point. It is desirable that a shift amount calculation unit calculate, based on cross-correlation of the toggle signal and absolute value of differentiated value of the spread code, the candidate of the shift amount which is to be provided to the spread code. It is desirable that a demodulating unit be configured so that it may demodulate the received signal with respect to the each candidate of the shift amount. It is desirable that a carrier inspecting section inspect the effectiveness of a carrier spectrum of the received signal demodulated in the demodulating unit.

In addition, it is desirable that the shift amount calculation unit be configured so that it may correlate between Fourier transformed value of the toggle signal and Fourier transformed value of the absolute value of differentiated value of the spread code.

The high-speed synchronization establishing method for spread spectrum communication of the present invention comprises the first step of detecting the candidate of the toggle point existing in the carrier of the received signal, the second step of calculating the shift amount based on the result of the detected candidate, and the third step of demodulating the received signal by multiplying the received signal by the spread code shifted according to the calculated shift amount.

In the steps, it is desirable that the expected signal which includes an waveform of the toggle point expected to be in the carrier of the received signal and has length corresponding to 2 chip-times of the spread code or shorter than the length be prepared previously. It is also desirable, in the first step, that the candidate of the toggle point be detected by correlating the expected signal and the carrier of the received signal.

Moreover, in the first step, it is desirable that the toggle detecting unit output the toggle signal as a result of detecting of the candidate of the toggle point. In the second step, it is desirable that the candidate of the shift amount which is to be provided to the spread code be calculated based on cross-correlation of the toggle signal and the absolute value of differentiated value of the spread code. In the third step, it is desirable that the received signal be demodulated with respect to the each candidate of the shift amount and the effectiveness of the carrier spectrum of the demodulated received signal be inspected.

Furthermore, when the candidate of the shift amount which is to be provided to the spread code is calculated in the second step, it is desirable that the Fourier transformed value of the toggle signal and the Fourier transformed value of the absolute value of differentiated value of the spread code be correlated.

BEST MODE FOR CARRYING OUT THE INVENTION

Figure 1:
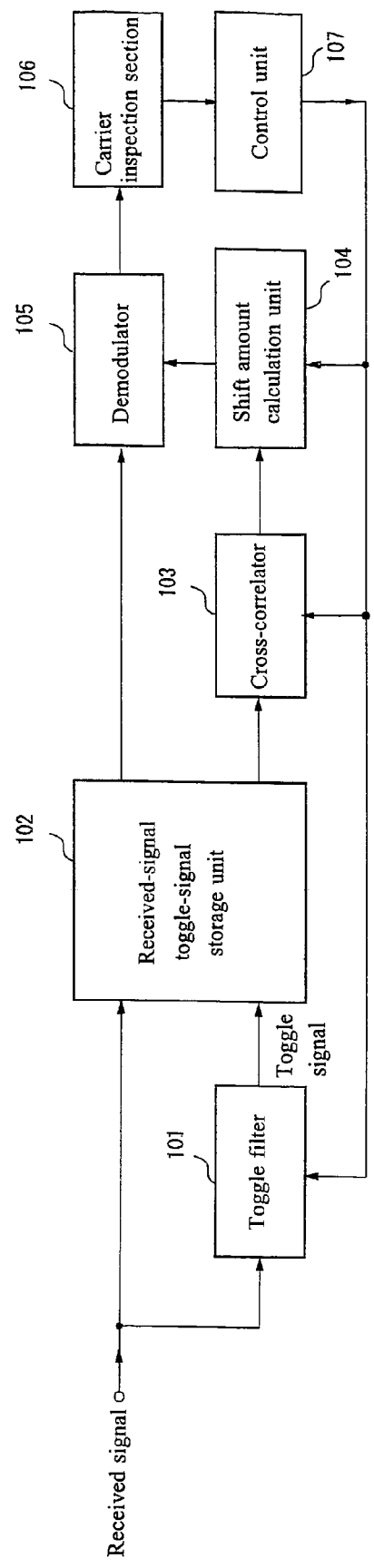
FIG. 1 is a block diagram showing outline architecture of a receiver of the equipment of the present invention.

A preferred embodiment of the present invention will be described by referring drawings. FIG. 1 is a block diagram showing outline architecture of a receiver in a communications equipment of the present invention. As shown in FIG. 1, the receiver comprises a toggle filter (a toggle detecting unit) 101, a received-signal toggle-signal storage unit 102, a cross-correlator (a cross-correlation unit) 103, a shift amount calculation unit 104, a demodulator (a demodulation unit) 105, a carrier inspection section 106, and a control unit 107.

The equipment of the present invention is the equipment for the spread spectrum communication, and can communicate in the following condition.

Carrier frequency: 150 MHz±15 ppm (2.2 kHz) (standard Xtal)
Period time of spread code: 1 second
Spread code length: 1,023 chips A signal transmitted or received on the equipment is outputted from a transmitter after a carrier is phase-modulated (spreaded) by a spread code. In the present embodiment, "carrier modulation by spread code" is performed by Binary Phase Shift Keying (BPSK). In addition, it is not always necessary to be modulated by BPSK. For example, it is able to be modulated by Quadrature Phase Shift Keying (QPSK). But, BPSK is superior to the others on anti-jamming performance.

When a signal outputted from the transmitter (a signal after spreading the carrier by the spread code) is received, the receiver demodulates (despreads) the signal (the received signal) and extracts an original carrier (a carrier before spreaded on the transmitter end) from the received signal.

The demodulation is performed by multiplying the received signal by the spread code (code-sequence being equivalent to the spread code applied for spreading the carrier on the transmitter end). In the demodulation, lots of toggle point (in which the phase is changed 180 degrees as a result that the carrier is modulated by the spread code. Transition point) in the carrier and the spread code applied for multiplying for the demodulation must be synchronized.

A phase lag is produced between the signal outputted from the transmitter end and the received signal by the relation with transmission-delay-time and such, and by the frequency deviation and such. Accordingly, the spread code must be shifted to an estimated synchronizing-position in order to synchronize lots of toggle point in the carrier of the received signal and the spread code applied for multiplying for the demodulation. ("Estimated synchronizing-position" is an estimated position where the spread code is synchronized by shifting in the received signal. "α" is a shift amount which is necessary for displacing the spread code to the estimated synchronizing-position.).

Accordingly, the equipment in the preferred embodiment preliminarily detects the estimated synchronizing-position from the waveform of the received signal (detecting a candidate of the toggle point in the received signal, and outputting the toggle signal) (the toggle filter 101); correlates between the toggle signal and the spread code (the cross-correlator 103); calculates candidates ($\alpha 1, \alpha 2 \ldots$) of the shift amount $\alpha$ based on the correlation (the shift amount calculation unit 104); tries to despread with respect to the each candidate of the shift amount (the demodulator 105); and then checks the extracted carrier every time and determines the feasibility of receiving (demodulating) (the carrier inspection section 106).

Elements composing the receiver of the equipment and relations of the elements will be described in detail. As shown in FIG. 1, the received signal, in the receiver of the equipment, is entered into the toggle filter 101 and the received-signal toggle-signal storage unit 102. The toggle filter 101 is configured with a FIR (Finite Impulse Response) digital filter. In addition, the toggle filter 101 can be configured with an IIR (Infinite Impulse Response) digital filter or a multiplier accumulator.

The toggle filter 101 detects, after the received signal is entered, the candidate of the toggle point (a phase-change point) in the received signal on the carrier and produces the toggle signal. More specifically, the toggle filter 101 previously holds an expected signal (or a feature calculated from the expected signal), correlates between the entered received signal and the expected signal (or the feature calculated from the expected signal) held previously, detects the phase-change point in the carrier, produces the toggle signal based on detected value of the phase-change point, and then outputs the toggle signal.

The received-signal toggle-signal storage unit 102 configured with memory is connected to the output end of the toggle filter 101. Accordingly, the toggle signal outputted from the toggle filter 101 as well as the received signal are entered into the received-signal toggle-signal storage unit 102. The entered received signal and the toggle signal are stored as a pair for post-processing.

The cross-correlator 103 is connected to the output end of the received-signal toggle-signal storage unit 102. The cross-correlator 103 is configured with a DSP (Digital Signal Processor) or cross-correlating means including a Fourier transformation processor by hardware logic.

The cross-correlator 103 correlates between the toggle signal (Fourier transformed value of the toggle signal) outputted from the received-signal toggle-signal storage unit 102 and the spread code (Fourier transformed value of the absolute value of differentiated value of the spread code), and outputs the correlation S(f).

More specifically, the cross-correlator 103 previously stores information, processed favorably for cross-correlating, about the spread code applied for demodulating the carrier. The information about the spread code is processed by the following procedure.

Absolute value of the spread code is obtained by differentiating the spread code k(t).

$d/dt k(t)$ $|d/dt k(t)| = ka(t)$

A conjugate of the cross-correlation is obtained from a sequence of the absolute value ka(t) by performing Fourier transform.

FFT(ka(t)) to FKA(f)

g(t) is the toggle signal entered into the cross-correlator 103 from the received-signal toggle-signal storage unit 102. The cross-correlator 103 performs Fourier transform to a sequence of the toggle signal g(t).

FFT(g(t)) to G(f)

Then, these values (Fourier transformed value of the absolute value of differentiated value of the spread code FKA(f) and Fourier transformed value of the sequence of the toggle signal G (f)) are cross-correlated.

$S(f) = FKA(f) \times G(f)$

After that, an obtained result (correlation S(f)) is outputted.

The shift amount calculation unit 104 is connected to the output end of the cross-correlator 103. The shift amount calculation unit 104 performs inverse Fourier transform to the correlation S(f) outputted from cross-correlator 103 and obtains s(t). The shift amount calculation unit 104 assumes that the peak value of the s(t) is the shift amount α (the shift amount required for shifting the spread code to the estimated synchronizing-position) which is to be provided to the spread code, and outputs more than one candidate of the shift amount $\alpha$ ($\alpha 1, \alpha 2 \ldots$) in descending order of the value of the s(t).

As mentioned above, the present invention can process for a long time by applying Fourier transform, instead of applying the conventional Surface Acoustic Wave (SAW) device.

The demodulator 105 is connected to the output end of the received signal of the received-signal toggle-signal storage unit 102. The demodulator 105 demodulates the received signals by multiplying the received signal outputted from the received-signal toggle-signal storage unit 102 by a shifted spread code.

The spread code is shifted by providing the candidates of the shift amount ($\alpha 1, \alpha 2 \ldots$) outputted from the shift amount calculation unit 104 to the spread code. More specifically, the spread code is shifted according to the value of the first candidate $\alpha 1$ of the shift amount, then the spread code is despreaded experimentally. After that, the spread code is provided the candidates of the shift amount in order, such as the second candidate $\alpha 2$ of the shift amount and the third candidate $\alpha 3$ of the shift amount. Then, repeatedly, the spread code is despreaded experimentally whenever the spread code is provided the candidates. Whenever the spread code is despreaded experimentally, a demodulated received-signal (a demodulated signal) is outputted from the demodulator 105.

The carrier inspection section 106 is connected to the output end of the demodulator 105. The carrier inspection section 106 is configured with a Fourier transform unit or a filter. The carrier inspection section 106 detects a spectrum of the each demodulated signal outputted from the demodulator 105 per the candidate of the shift amount ($\alpha 1, \alpha 2 \ldots$), inspects validity of the spectrum of the carrier, and determines the feasibility of the synchronization.

In addition, the control unit 107 is connected to the output end of the carrier inspection section 106. Concerning operations as mentioned above, the control unit 107 controls, based on the results output from the carrier inspection section 106, the toggle filter 101, the cross-correlator 103, and the shift amount calculation unit 104. Moreover, the control unit 107 produces the expected signal in the toggle filter 101, controls multiplex communication established by applying more than one different spread code to the mutual correlator 103, and controls others as well as operates as mentioned above.

Figure 2:
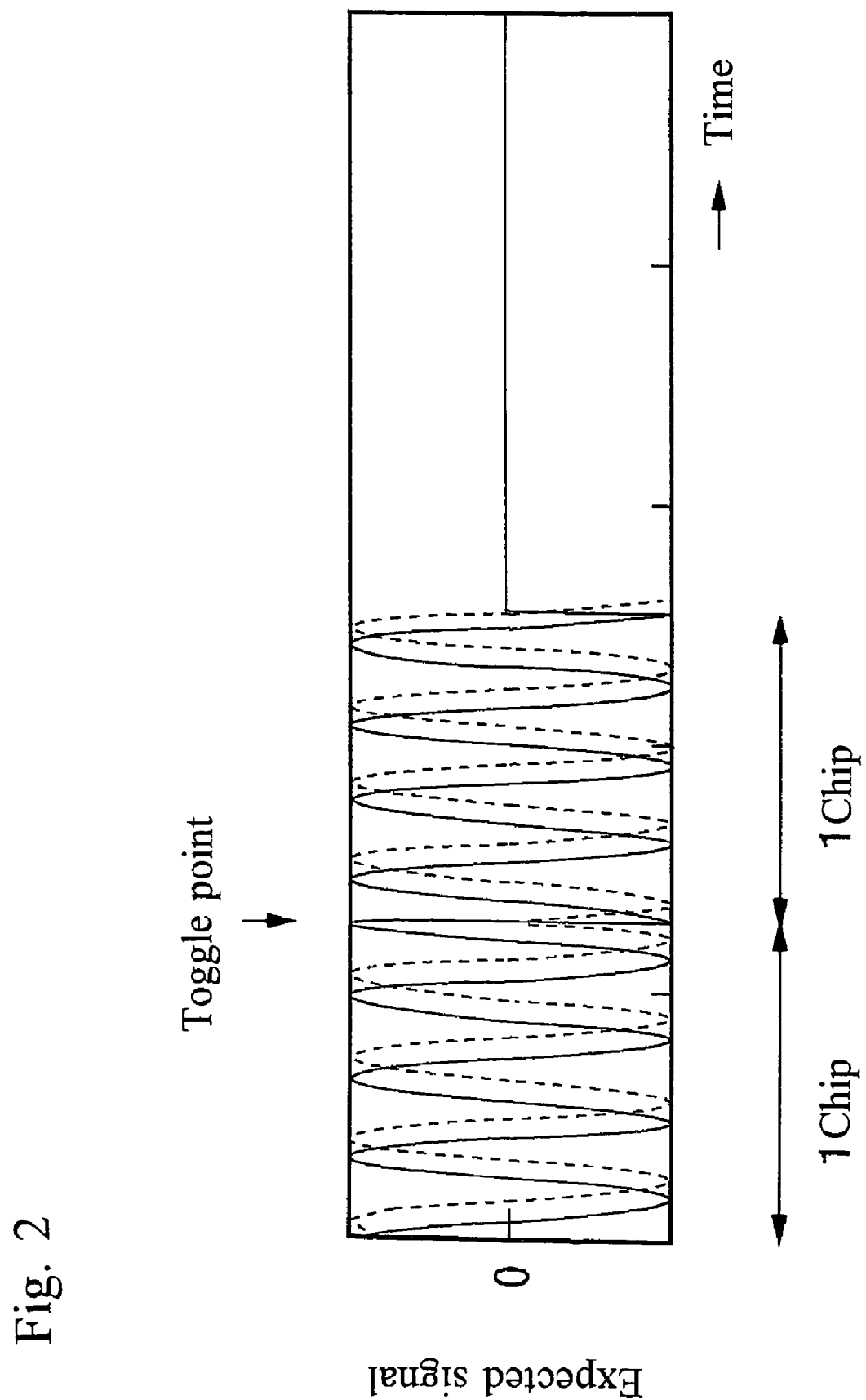
FIG. 2 is a drawing for explaining the expected signal held in a toggle filter 101 shown in FIG. 1.

Next, specific operations of the receiver shown in FIG. 1 will be described. FIG. 2 is a drawing for explaining the expected signal held in the toggle filter 101 shown in FIG. 1. The toggle filter 101, as mentioned above, detects the candidate of the toggle point in the received signal on the carrier and outputs the toggle signal. The expected signal shown in FIG. 2 is a signal pattern referred comparatively (calculated correlatively) in order to detect the candidate of the toggle point.

As shown in FIG. 2, the expected signal held in the toggle filter 101 has length corresponding to two chip-times of the spread code. In the center of the length of the expected signal, toggle point is located where the phase reversed 180 degrees. The expected signal is produced as a model of a waveform of the toggle point expected to be in the carrier of the received signal after spreading the carrier by the spread code, and as a model of a partial waveform around the toggle point.

As mentioned above, the expected signal has length corresponding to two chip-times of the spread code so that it may not include the other toggle point around the toggle point located in the center of the expected signal. In other words, when the expected signal has length corresponding to two chip-times of the spread code as mentioned above (or the expected signal has length which is shorter than length corresponding to two chip-times of the spread code), even if a short phase-change point by noise is included in the carrier of the received signal, the phase-change point shown by integral multiple of one chip-time can be detected as the candidate of the toggle point, instead the short phase-change point is detected as the candidate of the toggle point. In addition, a solid line and a dotted line show a real number part (cosine curve) and an imaginary number part (sine curve) of the expected signal respectively. The phase of these curves is shifted 90 degrees. The real number part and the imaginary number part are used as a useful expression for calculating complex number as mathematical technique for signal processing.

Figure 3:
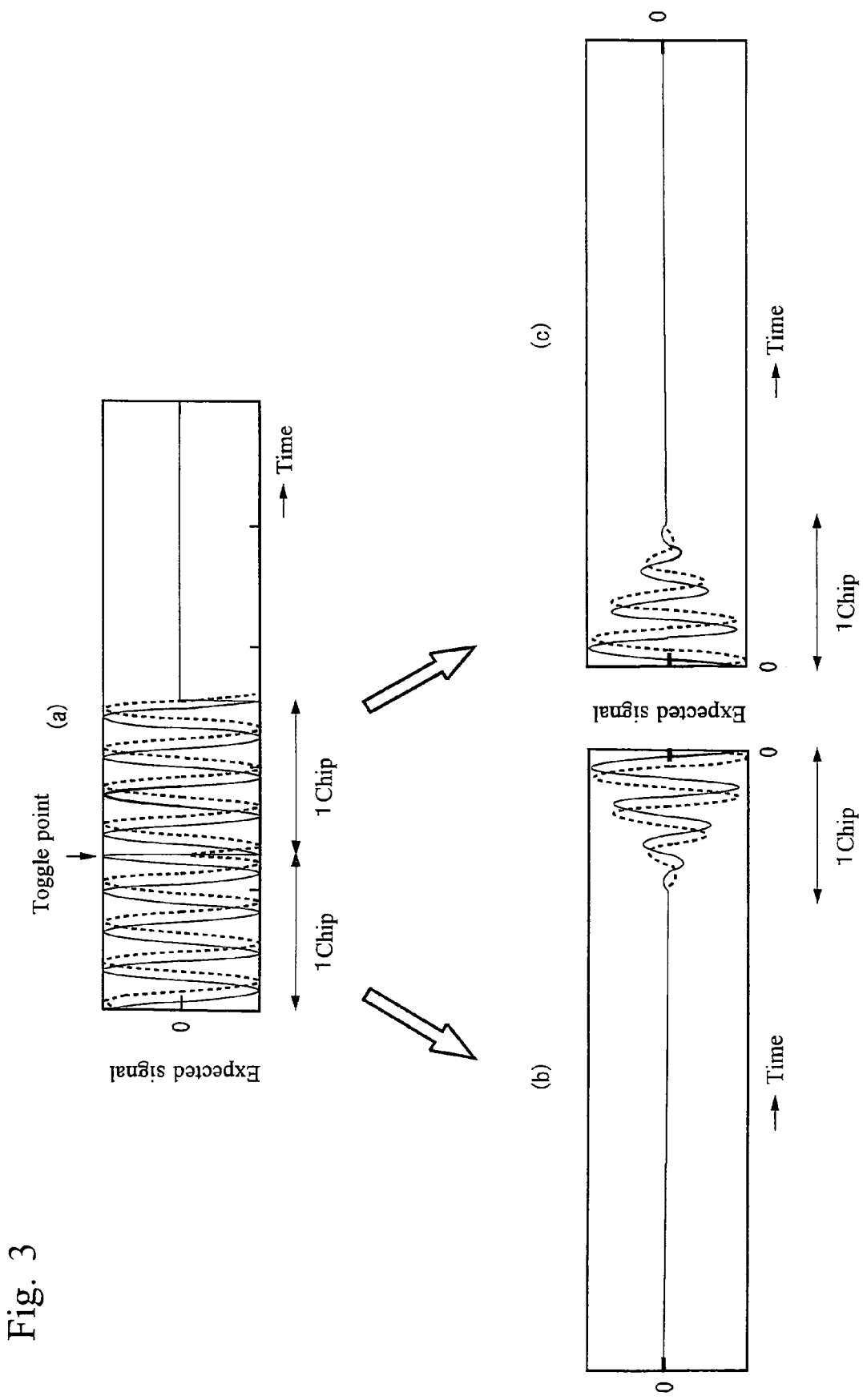
FIG. 3 is a drawing for explaining an example of the expected signal of FIG. 2 transformed by window function.

FIG. 3 is a drawing for explaining an example of the expected signal of FIG. 2 transformed by window function. In addition, FIG. 3(*a*) is corresponding to FIG. 2. FIG. 3(*b*) and FIG. 3(*c*) show waveforms of the expected signal which are transformed by multiplying the window function throughout the expected signal after the toggle point of FIG. 3(*a*) is shifted to the zero point. The window function is multiplied throughout the expected signal in order to prepare for performing Fourier transform after that. In addition, the transformed expected signal is divided into the fore part and the back part, and described in FIG. 3(*b*) and FIG. 3(*c*) respectively for developing a better understanding of this explanation. However, the transformed expected signal is a waveform continued temporally from the waveform of FIG. 3(*b*) to the waveform of FIG. 3(*c*).

In addition, the mask of the window function is not always necessary because an offset, which is obtained after calculation since the toggle point is placed at the center of the expected signal, is adjusted to zero.

Figure 4:
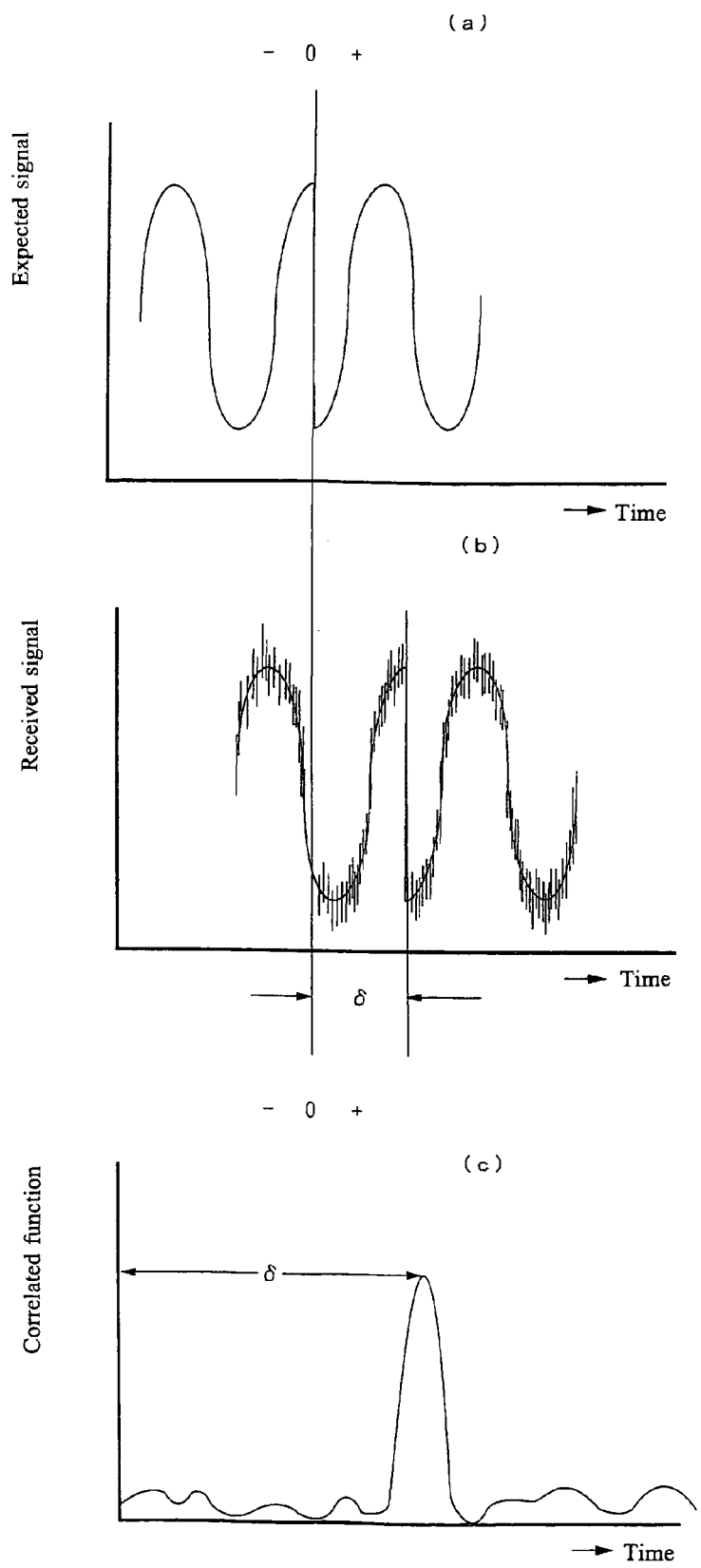
FIG. 4 is a drawing for explaining a detection of the candidate of the toggle point in the toggle filter 101 shown in FIG. 1.

FIG. 4 is a drawing for explaining a detection of the candidate of the toggle point in the toggle filter 101 shown in FIG. 1. As shown in FIG. 4(*a*), the phase of the waveform of the expected signal is reversed 180 degrees at the zero point. As shown in FIG. 4(*b*), when a part of the waveform having a similar aspect (180 degree-phase-reversed point in other words) to that of the expected signal is found at the position where the similar aspect is shifted by δ in the received signal, a correlated result (a correlated function) is obtained shown in FIG. 4(*c*) by correlating between the expected signal of FIG. 4(*a*) and the received signal of FIG. 4(*b*).

As shown in FIG. 4(*c*), a peak of the waveform of the correlated result is found at the position δ where the expected signal and the received signal are most likely to be matched. The toggle filter 101 outputs the waveform showing the correlated result as the toggle signal.

Figure 5:
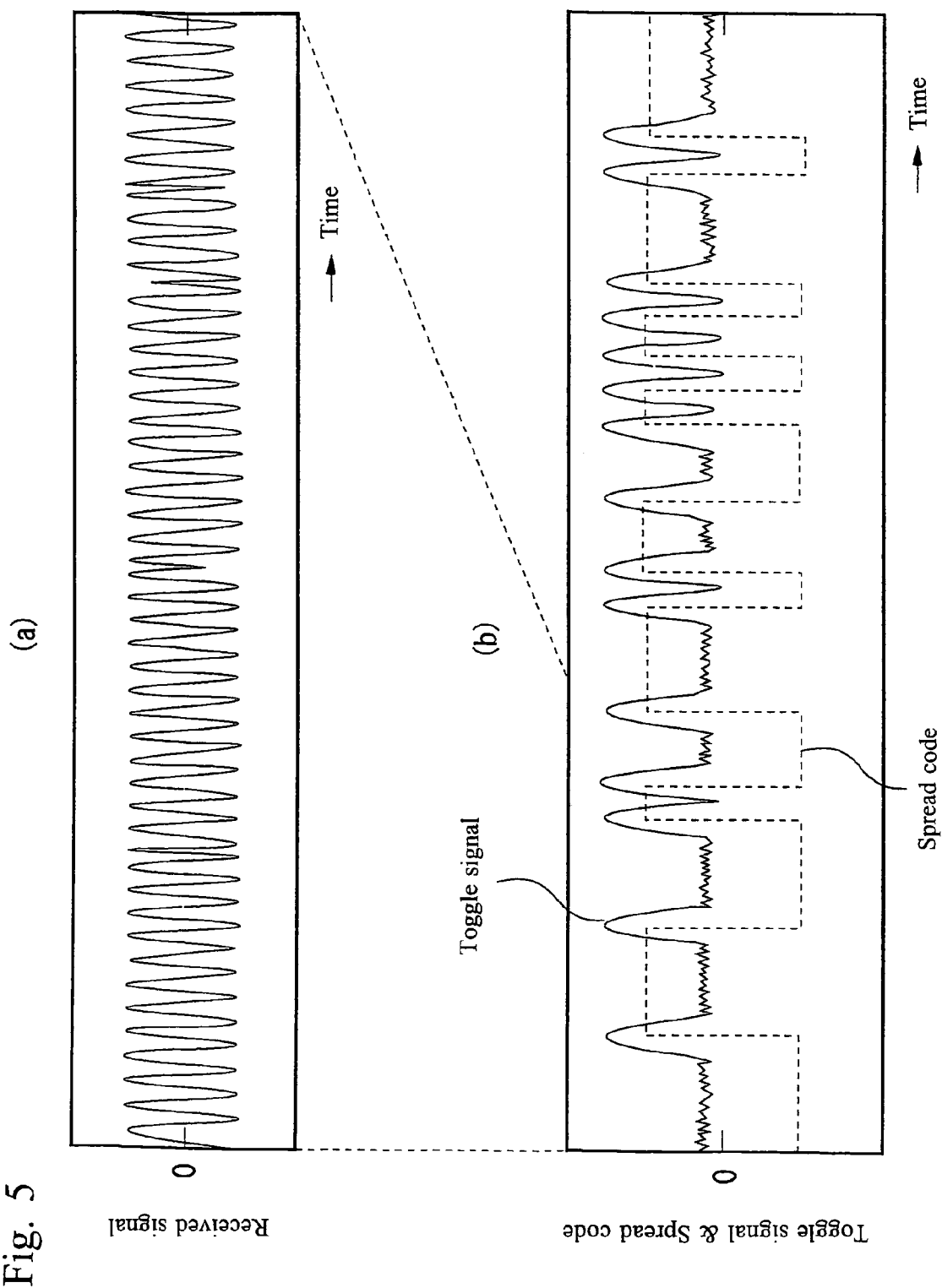
FIG. 5 is a drawing for explaining a relation of the received signal, the toggle signal, and the spread code.

FIG. 5 is a drawing for explaining a relation of the received signal, the toggle signal, and the spread code. The received signal shown in FIG. 5(*a*) is a carrier (150 MHz±15 ppm) modulated by Binary Phase Shift Keying using the spread code on the transmitter end. In addition, for developing a better understanding of this explanation, it is assumed that the received signal does not include noise from transmission channel.

A correlated result having an waveform drawn in a solid line in FIG. 5(*b*) is obtained by correlating between the received signal shown in FIG. 5(*a*) and the expected signal. The toggle filter 101 outputs the waveform drawn in the solid line as the toggle signal.

Peaks of the waveform of the toggle signal shown in FIG. 5(*b*) indicate the position where partial waveforms being most likely to match with waveforms of the expected signal in the received signal exist (in other words, the position that is presumed to be the toggle point). In substance, if the spread code applied for spreading the carrier at the transmitter (the waveform drawn in a broken line in FIG. 5(*b*)) and the toggle signal are overlapped, it is found that the peaks of the toggle signal are matched with the phase-changed point of the spread code. As mentioned above, the receiver of the equipment in the present embodiment correlates between the received signal and the expected signal after the received signal is entered, then detects the candidates of the toggle point included in the received signal.

Figure 6:
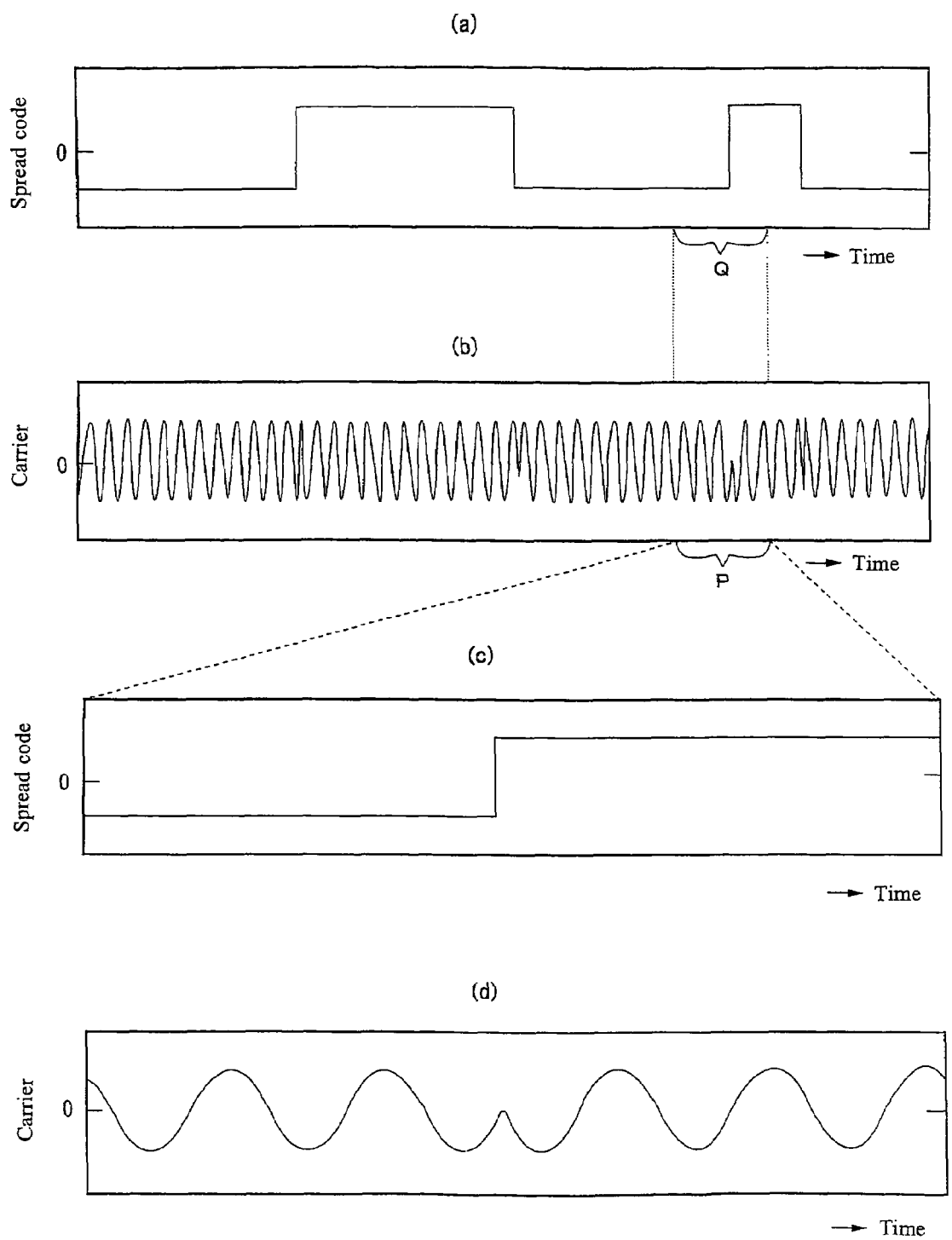
FIG. 6 is a drawing for showing an example of the waveform of the spread code applied for spreading the carrier and the carrier waveform spreaded by the spread code on the transmitting end, and a drawing of an example of the carrier and the spread code being synchronized.
Figure 7:
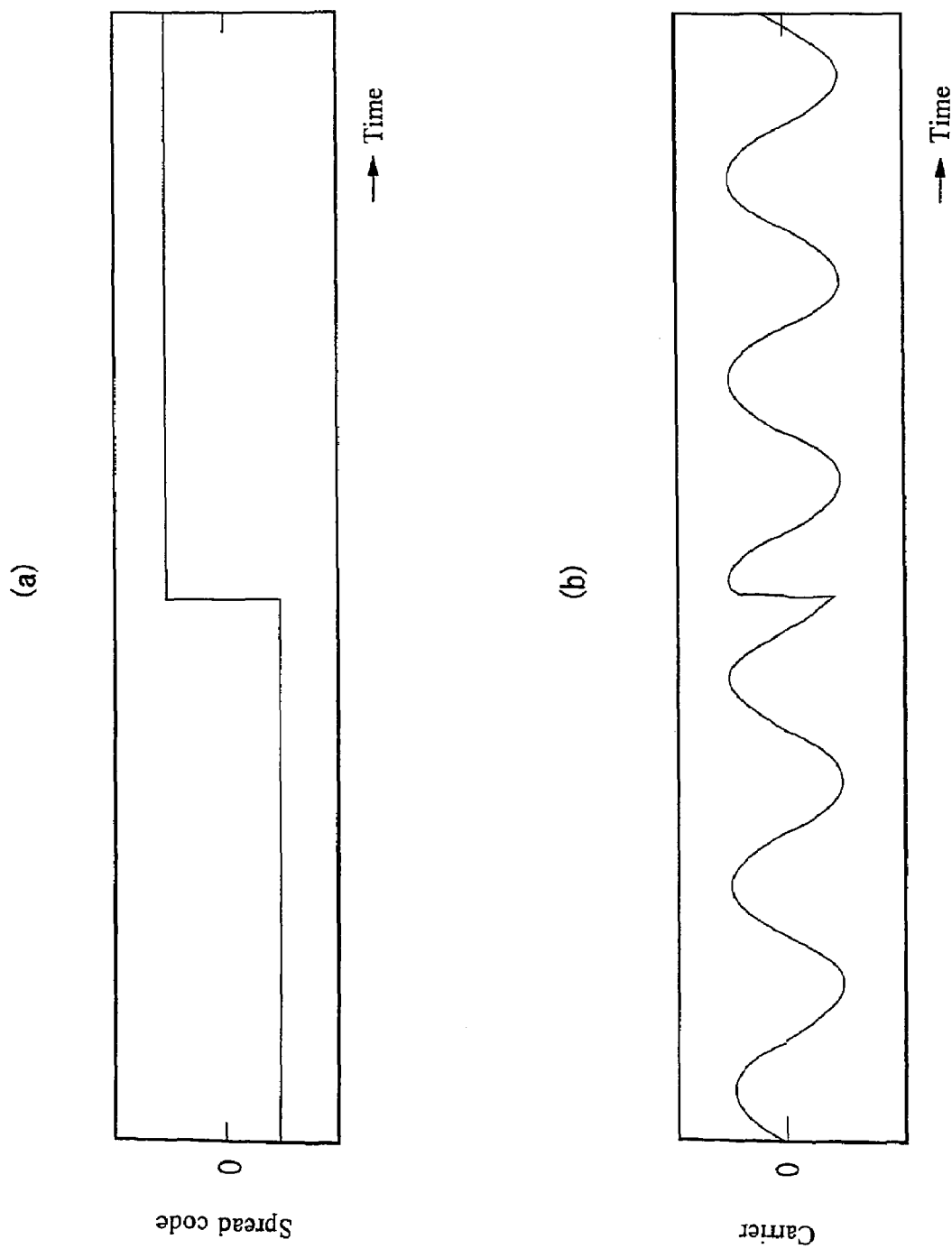
FIG. 7 is a drawing for showing an example of the carrier waveform when the carrier and the spread code are not synchronized.

FIG. 6 is a drawing for showing an example of the waveform of the spread code applied for spreading the carrier and the carrier waveform spreaded by the spread code on the transmitting end, and a drawing of an example of the carrier and the spread code being synchronized. FIG. 7 is a drawing for showing an example of the carrier waveform when the carrier and the spread code are not synchronized.

FIG. 6(*a*) shows the spread code. FIG. 6(*b*) shows a waveform of the carrier spreaded by the spread code of FIG. 6(*a*). In addition, FIG. 6(*c*) is an enlarged view of a part of the spread code corresponding to P of the carrier of FIG. 6(*b*) (Q in FIG. 6(*a*)). FIG. 6(*d*) is an enlarged view of P of the carrier of FIG. 6(*b*).

As shown in FIG. 6(*d*), a phase of the carrier in P is changed 180 degrees by the spread code shown in FIG. 6(*c*) at the point where the carrier is zero. In other words, the spread code is synchronized when the carrier passes across the zero in this example.

But, when the carrier is spreaded by the spread code on the transmitting end, the timing when the spread code is reversed and the timing when the carrier passes across the zero are not always matched. In other words, the carrier and the spread code applied for spreading the carrier on the transmitting end are not always synchronized as shown FIG. 6(*d*).

For example, when the reversed point of the spread code spreading the carrier corresponds to the position where the spread code is close to the bottom after it passes the zero (refer to FIG. 7(*a*)), the carrier shows the waveform including the toggle point as shown in FIG. 7(*b*). In other words, when the carrier is spreaded on the transmitting end, the toggle point is produced without synchronizing the carrier and the spread code.

In the present embodiment, the toggle point included in the carrier of the received signal can be detected steadily (detected preliminary), even if the carrier and the spread code for spreading the carrier are not synchronized as shown in FIG. 7(b) as well as they are synchronized as shown in FIG. 6(d).

The toggle filter 101 makes it possible by complex calculation. In other words, even if the carrier has the frequency deviation; if the phase of the carrier is guaranteed at least an equivalent of one chip-time (or guaranteed half length of the expected signal), the toggle filter 101 can detect, without reference to the waveform of the carrier, the point where the phase is reversed 180 degrees (or the point that is presumed to be the toggle point) in the carrier.

As mentioned above, the toggle point can be detected when the phase of the carrier is guaranteed at least an equivalent of one chip-time. Accordingly, an allowable value about the phase is larger by the ratio of the spread-code length than conventional procedures (slide method and others). When the spread code, the period of which is one second and the code length of which is 1,023 chips, is applied; the phase of the carrier can be allowable up to 180-degree-change in two chip-times (approximately 2 ms). Therefore, when the carrier frequency is 150 MHz, the allowable value is 250 Hz.

Moreover, when the spread code, the period of which is 0.1 second and the code length of which is 1,023 chips, is applied; the phase of the carrier can be allowable up to 180-degree-change in 0.2 ms; if the carrier frequency is 150 MHz, the allowable value is 2.50 kHz. In this case, since the deviation can be allowable up to ±16 ppm; a normal quartz-crystal oscillator can be employed, a very low-priced transmission system can be realized.

Figure 8:
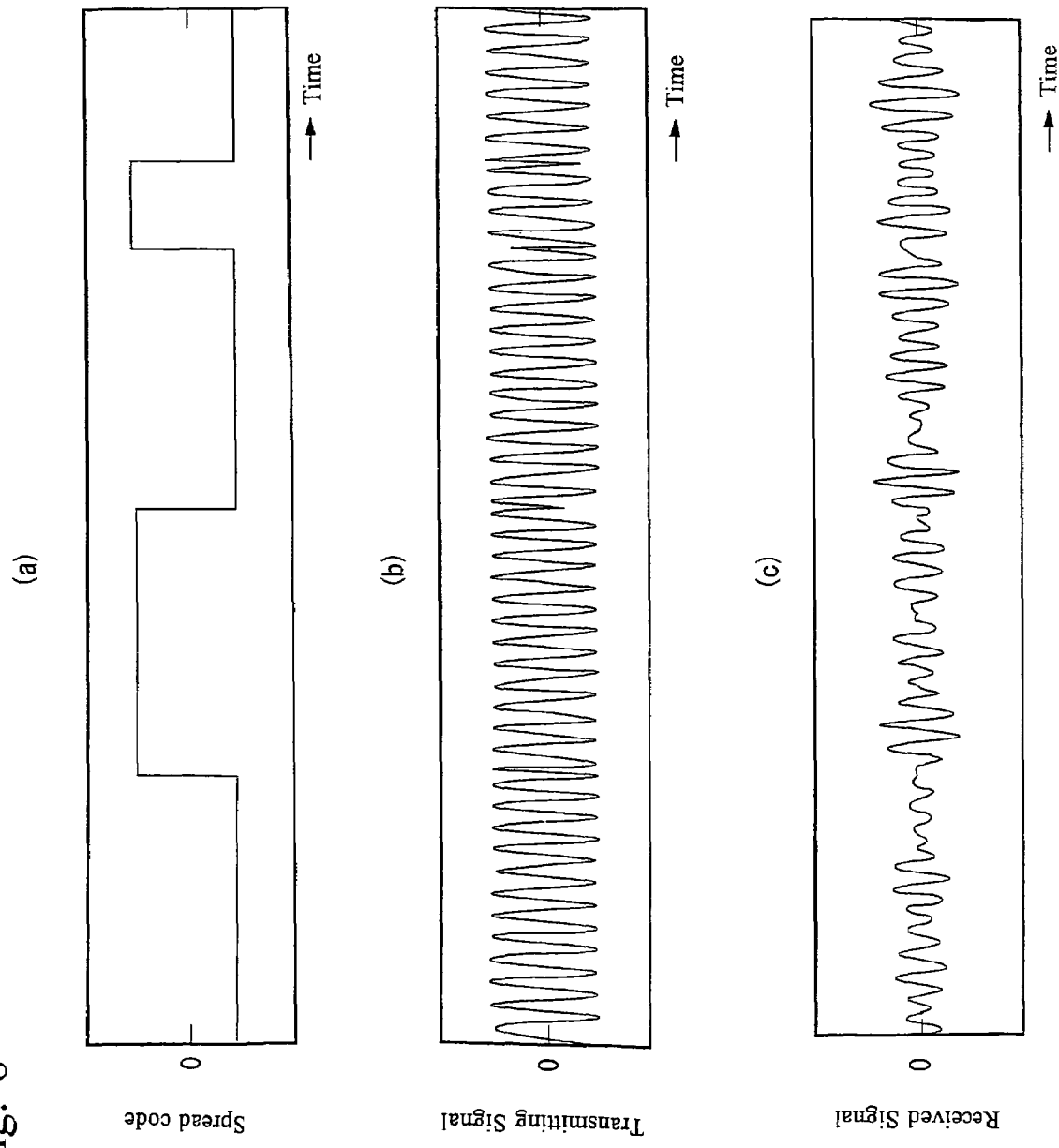
FIG. 8 is a drawing for showing an example of the received signal including noise.

FIG. 8 is a drawing for showing an example of the received signal including noise. FIG. 8(a) shows the spread code applied on the transmitting end. FIG. 8(b) shows the transmitting signal (150 MHz±15 ppm) modulated by Binary Phase Shift Keying using the spread code of the FIG. 8(a). FIG. 8(c) shows the received signal received on the receiver after transmitted via the transmission channel.

The received signal of FIG. 8(c) is calculated numerically so that the S/N ratio (the S/N ratio at the stage of limiting the band on the receiver) may be −17.4 dB by adding a lot of noise power on the signal power of the transmitting signal of FIG. 8(b).

Figure 9:
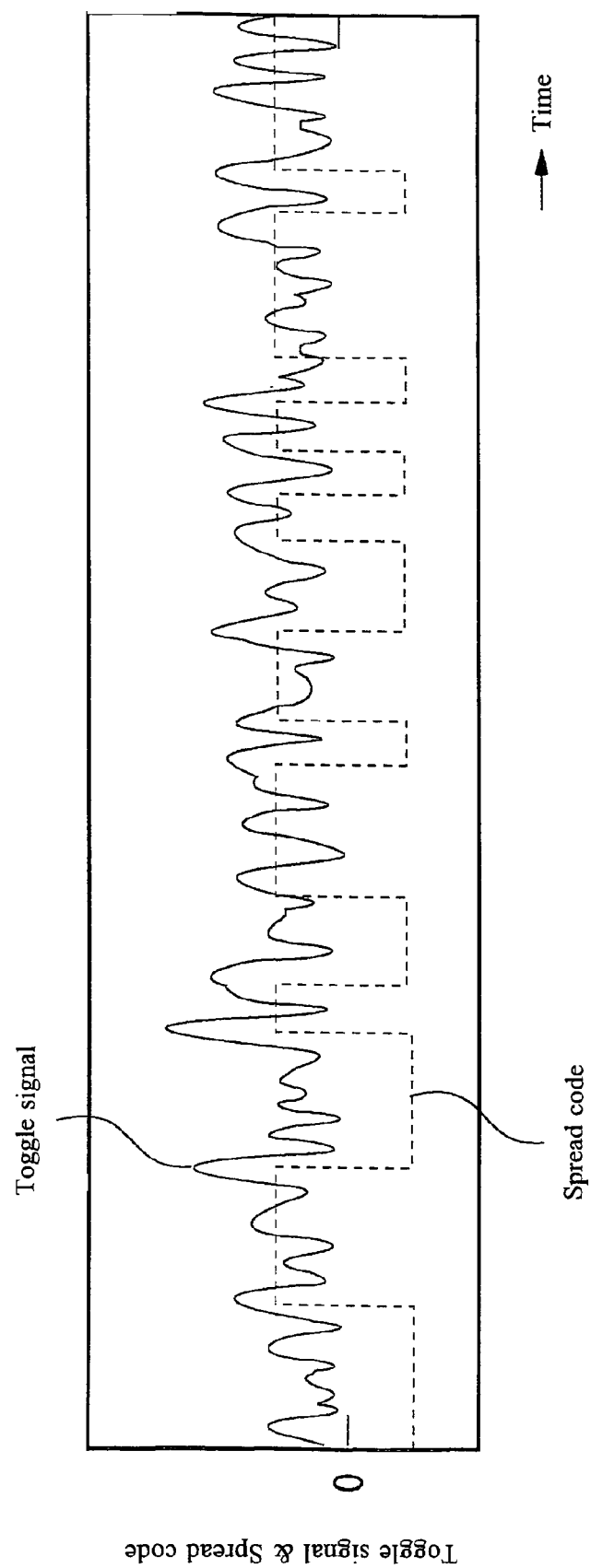
FIG. 9 is a drawing for explaining a relation of the toggle signal, outputted from the toggle filter 101 when the received signal of FIG. 8(c) is inputted into the toggle filter 101, and the spread code applied for spreading the carrier.

FIG. 9 is a drawing for explaining a relation of the toggle signal, outputted from the toggle filter 101 when the received signal of FIG. 8(c) is inputted into the toggle filter 101, and the spread code applied for spreading the carrier. In addition, a solid line in FIG. 9 shows the waveform of the toggle signal and a broken line shows the waveform of the spread code.

As shown in FIG. 9, when the received signal includes noise, the toggle signal outputted from the toggle filter 101 is distorted compared with the toggle signal which does not include noise (refer to FIG. 5(b)). In addition, peaks in this toggle signal show the position that is presumed to be the toggle point in the received signal.

In substance, when the spread signal applied for spreading the carrier on the transmitting end and the toggle signal are overlapped, the peaks in the toggle signal almost match with the phase-changed points of the spread code but it is a little difficult to distinguish the peaks since distorted waves are included by the effect of the noise.

However, since this "outputting the toggle signal from the toggle filter 101" is just a step for preliminary detecting, it is not necessary that the toggle point in the carrier of the received signal is determined reliably at this step (in other words, from the waveform of the toggle signal.). The toggle signal, the estimated synchronizing-position, and the shift amount α are inspected precisely through each step (cross-correlating by the cross-correlator 103, calculating of shift amount α by the shift amount calculation unit 104, demodulating by the demodulator 105, and detecting for the spectrum by the carrier inspection section 106).

Figure 10:
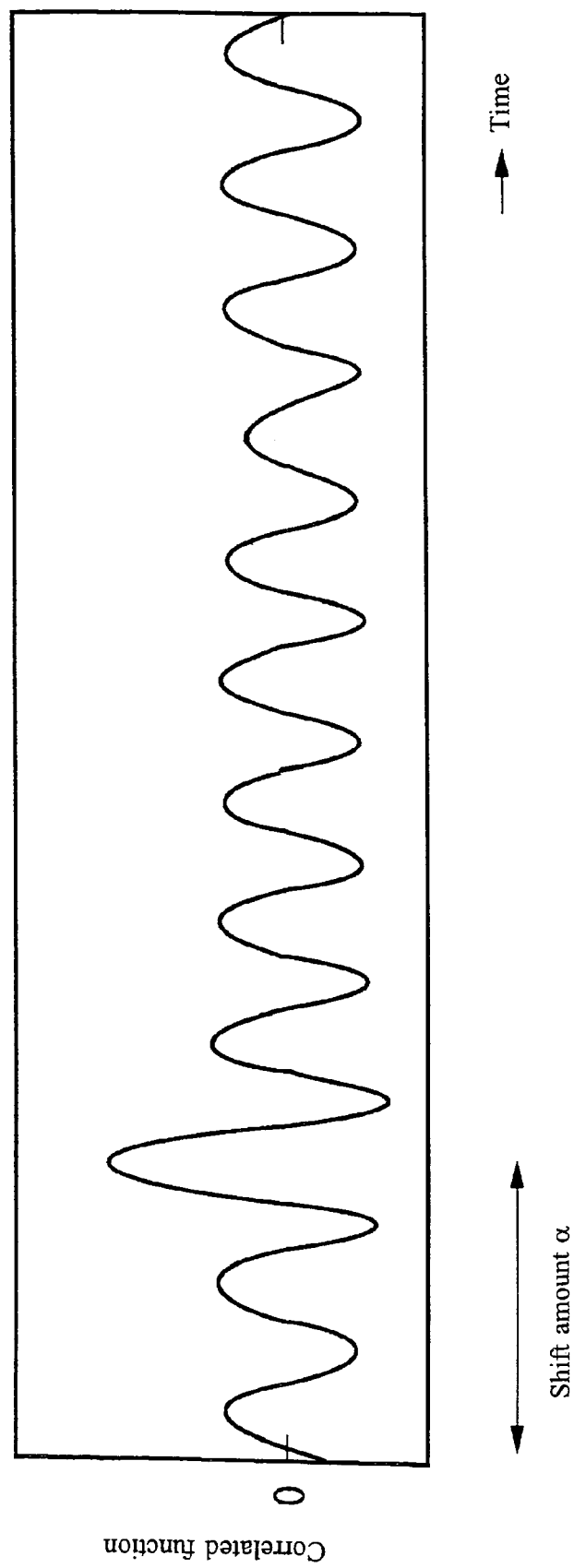
FIG. 10 is a drawing for showing a result of the cross-correlation of the toggle signal and the spread code of FIG. 9.

FIG. 10 shows a cross-correlated result (cross-correlated function) of the toggle signal (the signal outputted from the toggle filter 101 after the received signal of FIG. 8(c) is inputted) and the spread code by the cross-correlator 103. Peaks value in the cross-correlation shown in FIG. 10. are candidates of the shift amount α (α1, α2 . . . ).

In the present embodiment, faulty and improper signals (including high-power irregular noise) are ultimately eliminated and the synchronization can be established quickly by analyzing the result which is obtained by correlating between the toggle signal and the absolute value of differentiated value of the spread code throughout the sequence of the spread code, after the frequency deviation is overcome and pre-processing for obtaining the toggle signal throughout the sequence of the spread code is correlated quickly for detecting the candidates of the toggle point.

Figure 11:
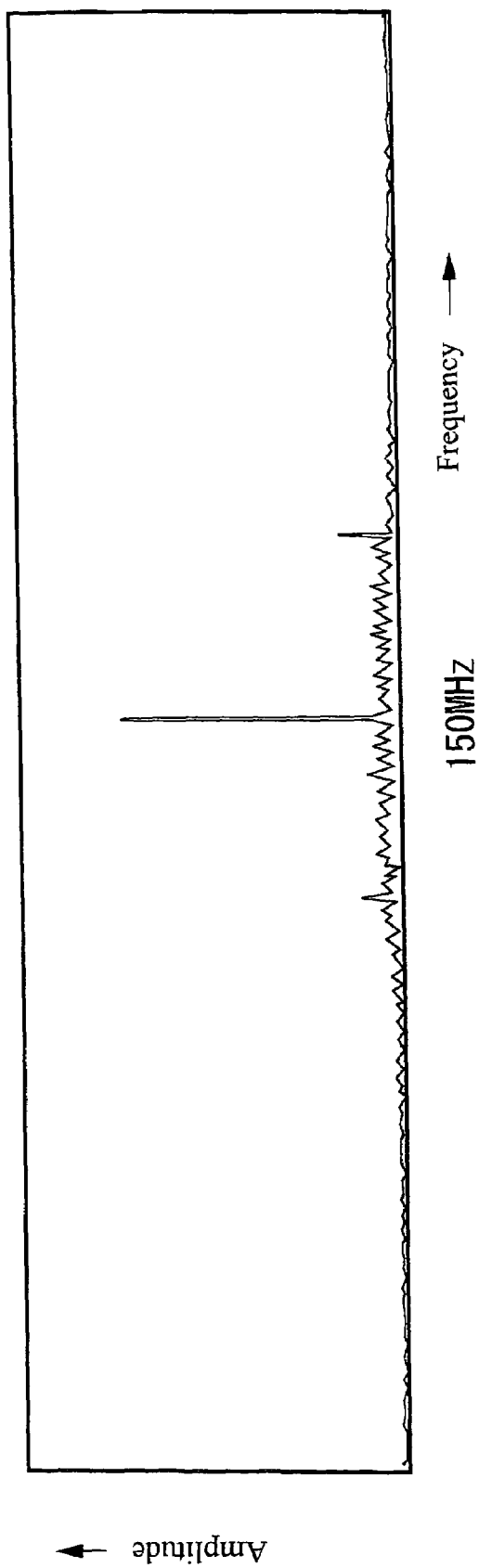
FIG. 11 is a drawing for showing an example of the demodulated signal which is outputted from the demodulator 105 and detected as a spectrum in a carrier inspecting section 106.

FIG. 11 is a drawing for showing an example of the demodulated signal (the received signal demodulated by the spread code shifted by providing the shift amount α) which is outputted from the demodulator 105 and detected as a spectrum in the carrier inspecting section 106. A spectrum of 150 MHz is found in this example as shown in FIG. 11.

As mentioned above, the present invention can establish the synchronization at a high speed since it can detect steadily the toggle point where the carrier is not synchronized with the spread code by allowing the frequency deviation of the carrier. Accordingly, the present invention can reduce remarkably the transmitting time and the electric power for transmitting. Furthermore, the high-speed establishment for synchronization brings useful effects to various kinds of fields as well as the problem of the privacy function or the effective time of the battery.

In addition, "high-speed" mentioned above means "time corresponding to one sequence of the spread code". Accordingly, the synchronization can be established within the time corresponding to one sequence of the applied spread code from the beginning of the receiving. For example, when the spread code, the one chip-time of which is 0.1 ms and the code length of which is 1,023 chips, is applied; one sequence is 0.1 s.

Therefore, eight sequences can be transmitted in 0.8 seconds and eight-bits information can be transmitted. For example, since the burst transmission transmitted once in ten seconds uses only the one-twelfth of the time, the other time can be used for other communications. Moreover, the spread spectrum communication which normally requires a long time can be achieved by continual communication.

Furthermore, when the carrier frequency is 150 MHz and the spread-code length is one second, the present invention can resolve the frequency deviation 0.5 Hz and can detect the radial velocity of 1 m/s from the receiving station. Accordingly, the transmission quality is improved, thus even low quality transmitters on animals (such as birds and humans) or on low-speed movable bodies can communicate.

Moreover, the present invention can be applied for detecting the speed of low-speed movable bodies and for estimating locations.

Figure 12:
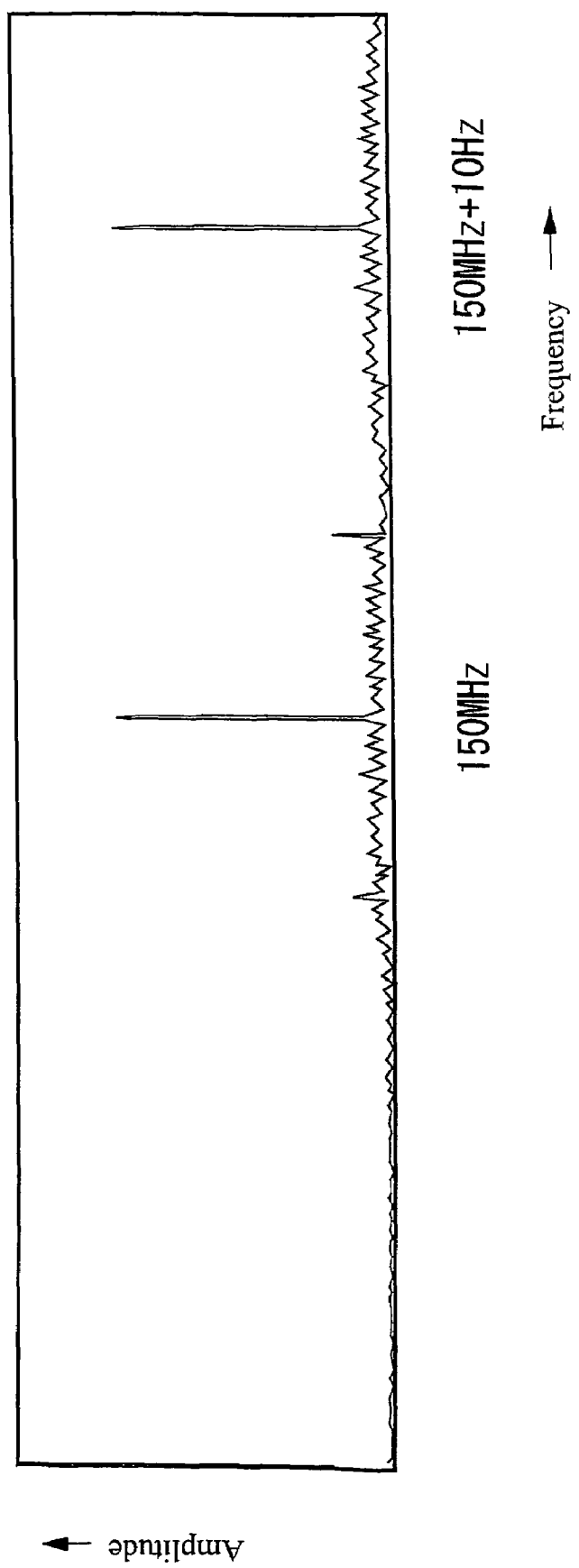
FIG. 12 is a drawing for showing another example of the demodulated signal which is outputted from the demodulator 105 and detected as a spectrum in a carrier inspecting section 106, and a drawing for showing an example of a result of a mixed numerical calculation of two carriers differed by 10 Hz.

FIG. 12 is a drawing for showing another example of the demodulated signal which is outputted from the demodulator 105 and detected as a spectrum in the carrier inspecting section 106, and a drawing for showing an example of the result of a mixed numerical calculation of two carriers differed by 10 Hz.

As shown in FIG. 12, two spectrums are found at 150 MHz and 150 MHz+10 Hz in this example. In the present invention, the carrier frequency is demodulated and detected after the synchronization is established. Accordingly, the present invention can communicate information by different frequencies having the same spread code. More specifically, the frequency deviation (150 MHz±15 ppm (2.25 kHz)) of the carrier can be divided by 5 Hz. Thus, the present invention enables multiplex communication.

Furthermore, in the present embodiment, the candidate of the toggle point is detected to begin with, then the spread code is applied. Accordingly, more than one spread code can be detected simultaneously. In other words, the present invention enables transmission of information by more than one spread code and more than one frequency of the carrier. Therefore, the present invention enables multiplex communication by a wider technique, and enables massive communications. Moreover, the present invention can suppress the interference properly.

In addition, in the present embodiment, the toggle filter 101 is employed for detecting the toggle point as the toggle detecting unit, and the toggle filter 101 detects the phase-change point in the received signal. However, under the condition of less noise, the phase-change point in the received signal may be detected without the toggle filter by Hilbert conversion, by detecting phase, or by PLL (Phase Locked Loop).

In addition, the toggle detecting unit may be configured with a Surface Acoustic Wave (SAW) device filter, a DSP, or other circuits.

Moreover, the present invention can be applied to all the media for transmission such as transmission by electric wave, transmission by acoustic wave, and transmission by light wave. Furthermore, the present invention can be applied to a high-power spread spectrum communication as well as a super-low-power long-distance communication.

INDUSTRIAL APPLICABILITY

The equipment of this invention for spread spectrum communication enables to establish synchronization of the spread code even if the carrier frequency is not known precisely since it preliminarily detects the candidate of the toggle point in the received signal on the carrier and outputs the toggle signal, then correlates between the outputted toggle signal and the absolute value of differentiated value of the spread code, then calculates the shift amount of the spread code based on the peak value of the cross-correlation, and then demodulates the received signal by multiplying the received signal by the spread code which is shifted according to the calculated shift amount.

Accordingly, the toggle point can be detected steadily and the high-speed synchronization can be realized even if the toggle point where the carrier is not synchronized with the spread code by allowing the frequency deviation of the carrier.

What is claimed is:

1. A device for spread spectrum communication comprising:

a toggle detecting unit which detects a candidate of a toggle point existing in a carrier of a received signal by calculating correlation between the carrier of the received signal and a pre-held expected signal and then searching for positions of phase changing points expected to be in the received signal but whose positions are currently unknown, wherein the received signal is a modulated waveform of the carrier wave itself, and wherein the pre-held expected signal is a signal including a waveform of the toggle point which is expected to be in the carrier of the received signal and is a signal having a length corresponding to 2 chip-times of a spread code or is a signal having a shorter length than 2 chip-times of the spread code, and said 2 chip-times of the spread code being that portion of the expected signal extending from both sides of the toggle point a distance of 1 chip-time; and a demodulating unit which demodulates the received signal by multiplying the received signal by the spread code which is shifted according to a shift amount calculated based on the detected candidate.

2. The device as claimed in claim 1, wherein:

said toggle detecting unit outputs a toggle signal as a result of detecting the candidate of the toggle point;

a candidate of the shift amount which is to be provided to the spread code is calculated based on crosscorrelation of the toggle signal and an absolute value of a differentiated value of the spread code;

said demodulating unit demodulates the received signal by shifting the spread code with respect to each candidate of the shift amount, and effectiveness of a carrier spectrum of the received signal demodulated in the demodulating unit is inspected.

3. The device as claimed in claim 2, wherein the candidate of the shift amount which is to be provided to the spread code is calculated by correlating between a Fourier transformed value of the toggle signal and a Fourier transformed value of the absolute value of the differentiated value of the spread code.

4. The device as claimed in claim 1, wherein the pre-held expected signal is a signal having a length corresponding to 2 chip-times of the spread code.

5. The device as claimed in claim 1, wherein the pre-held expected signal is a signal having a shorter length than 2 chip-times of the spread code.

6. A high-speed synchronization establishing method for spread spectrum communication, said method comprising:

detecting a candidate of a toggle point existing in a carrier of a received signal, the received signal being a modulated waveform of the carrier wave itself; thereafter calculating a shift amount based on the detected candidate; and thereafter demodulating the received signal by multiplying the received signal by a spread code shifted according to the calculated shift amount;

wherein the candidate of the toggle point is detected by calculating correlation between an expected signal and the carrier of the received signal and then searching for positions of phase changing points expected to be in the received signal but whose positions are currently unknown; and wherein the expected signal is prepared previously and includes a waveform of the toggle point expected to be in the carrier of the received signal and has a length corresponding to 2 chip-times of the spread code or has a shorter length than 2 chip-times of the spread code, and said 2 chip-times of the spread code being that portion of the expected signal extending from both sides of the toggle point a distance of 1 chip-time.

7. The high-speed synchronization establishing method for spread spectrum communication as claimed in claim 6, wherein:

a toggle signal is outputted as a result of detecting the candidate of the toggle point;

a candidate of the shift amount which is to be provided to the spread code is calculated based on cross-correlation of the toggle signal and an absolute value of a differentiated value of the spread code;

the received signal is demodulated with respect to each candidate of the shift amount; and effectiveness of a carrier spectrum of the demodulated received signal is inspected.

8. The high-speed synchronization establishing method for spread spectrum communication as claimed in claim 7, wherein a Fourier transformed value of the toggle signal and a Fourier transformed value of the absolute value of the differentiated value of the spread code are correlated when the candidate of the shift amount which is to be provided to the spread code is calculated.

9. The high-speed synchronization establishing method for spread spectrum communication as claimed in claim 6, wherein the expected signal has a length corresponding to 2 chip-times of the spread code.

10. The high-speed synchronization establishing method for spread spectrum communication as claimed in claim 6, wherein the expected signal has a shorter length than 2 chip-times of the spread code.

* * * * *